(12) United States Patent
Wilkinson

(10) Patent No.: US 8,789,852 B2
(45) Date of Patent: Jul. 29, 2014

(54) HOSE REPAIR CLAMP

(75) Inventor: Travis T. Wilkinson, Thomaston, AL (US)

(73) Assignee: Hosebee, LLC, Thomaston, AL (US)

( * ) Notice: Subject to any disclaimer, the term of this patent is extended or adjusted under 35 U.S.C. 154(b) by 229 days.

(21) Appl. No.: 13/095,579

(22) Filed: Apr. 27, 2011

(65) Prior Publication Data

US 2012/0274061 A1 Nov. 1, 2012

(51) Int. Cl.
*F16L 55/178* (2006.01)

(52) U.S. Cl.
USPC .............................. 285/15; 285/373; 138/97

(58) Field of Classification Search
USPC .................. 285/15, 373, 371, 398; 138/97
See application file for complete search history.

(56) References Cited

U.S. PATENT DOCUMENTS

| | | | | |
|---|---|---|---|---|
| 732,400 | A * | 6/1903 | Dresser et al. .................. | 138/99 |
| 1,290,041 | A | 1/1919 | Anderson | |
| 1,619,287 | A | 3/1927 | Charter | |
| 2,685,458 | A | 8/1954 | Shaw | |
| 3,188,117 | A * | 6/1965 | Press et al. ....................... | 285/55 |
| 3,386,754 | A | 6/1968 | Morrison | |
| 3,790,194 | A * | 2/1974 | Kimberley ..................... | 285/373 |
| 3,954,288 | A * | 5/1976 | Smith .............................. | 285/93 |
| 4,000,921 | A | 1/1977 | Daspit | |
| 4,018,979 | A * | 4/1977 | Young ............................ | 174/359 |
| 4,043,857 | A * | 8/1977 | Byrne et al. ................... | 156/198 |
| 4,064,614 | A | 12/1977 | Horvath | |
| 4,111,234 | A | 9/1978 | Wells et al. | |
| 4,215,880 | A | 8/1980 | Trittipoe | |
| 4,426,103 | A | 1/1984 | Sundholm | |
| 4,620,695 | A | 11/1986 | Vanistendael | |
| 4,768,813 | A * | 9/1988 | Timmons ....................... | 285/373 |
| 4,874,190 | A | 10/1989 | Reynolds | |
| 5,048,169 | A | 9/1991 | Beggiato | |
| 6,131,957 | A * | 10/2000 | Saito et al. ............... | 285/133.21 |
| 6,220,302 | B1 * | 4/2001 | Nolley ............................ | 138/99 |
| 6,302,450 | B1 * | 10/2001 | Dole et al. .................... | 285/328 |
| 6,305,719 | B1 * | 10/2001 | Smith et al. ...................... | 285/15 |
| 6,467,820 | B1 | 10/2002 | Albrecht et al. | |
| 6,505,865 | B2 | 1/2003 | Minemyer | |
| 6,672,628 | B2 | 1/2004 | Thomas | |
| 6,851,726 | B2 * | 2/2005 | Minemyer ..................... | 285/322 |
| 6,916,051 | B2 * | 7/2005 | Fisher ............................ | 285/373 |
| 7,900,655 | B2 * | 3/2011 | Morton et al. .................. | 138/99 |
| 8,210,210 | B2 * | 7/2012 | Clark et al. ..................... | 138/99 |
| 2002/0033604 | A1 * | 3/2002 | Minemyer .................... | 285/373 |
| 2009/0294603 | A1 | 12/2009 | Amundson | |

FOREIGN PATENT DOCUMENTS

DE 3820379 1/1989

OTHER PUBLICATIONS

International Search Report and Written Opinion issued Jul. 10, 2012 in International Application No. PCT/US2012/035525 filed Apr. 27, 2012, 9 pages.

* cited by examiner

*Primary Examiner* — James Hewitt
(74) *Attorney, Agent, or Firm* — Angela Holt; Bradley Arant Boult Cummings LLP

(57) ABSTRACT

A hose clamp for repairing high pressure hydraulic hoses comprises a first clamp portion mated to a second clamp portion around a hose. The first and second clamp portions each comprise a semi-cylindrical channel extending longitudinally along an inner surface of the clamp. The hose is received within the channel and a plurality of fasteners releasably affix the clamp portions together. A plurality of barbs extending circumferentially around the channel compress the hose to minimize leakage from the hose.

7 Claims, 5 Drawing Sheets

HOSE REPAIR CLAMP

BACKGROUND AND SUMMARY OF THE INVENTION

High pressure hydraulic hoses failing in use in the "field" cost time and money. Typically, a user must replace a leaky hydraulic hose before work can resume, as there are few, if any, known field repairs available for high pressure hydraulic hoses.

The device according to the present disclosure comprises two clamp portions which "sandwich" a hose at the point of leakage. A semi-cylindrical channel extending along the inner surface of the clamp portions receives the hose and a plurality of fasteners fixes the two clamp portions together. Barbs extending into the channel protrude into the hose and seal against the outside rubber layer of the hose. Because the outside rubber layer of the hose is resilient, the barbs further cause the outside rubber layer to press against the inner hose layers. The compression of the barbs into the hose minimizes leakage longitudinally along the hose. Gasket seals extending along sealing surfaces of the clamp portions minimize leakage from the joint where the clamp portions join together.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
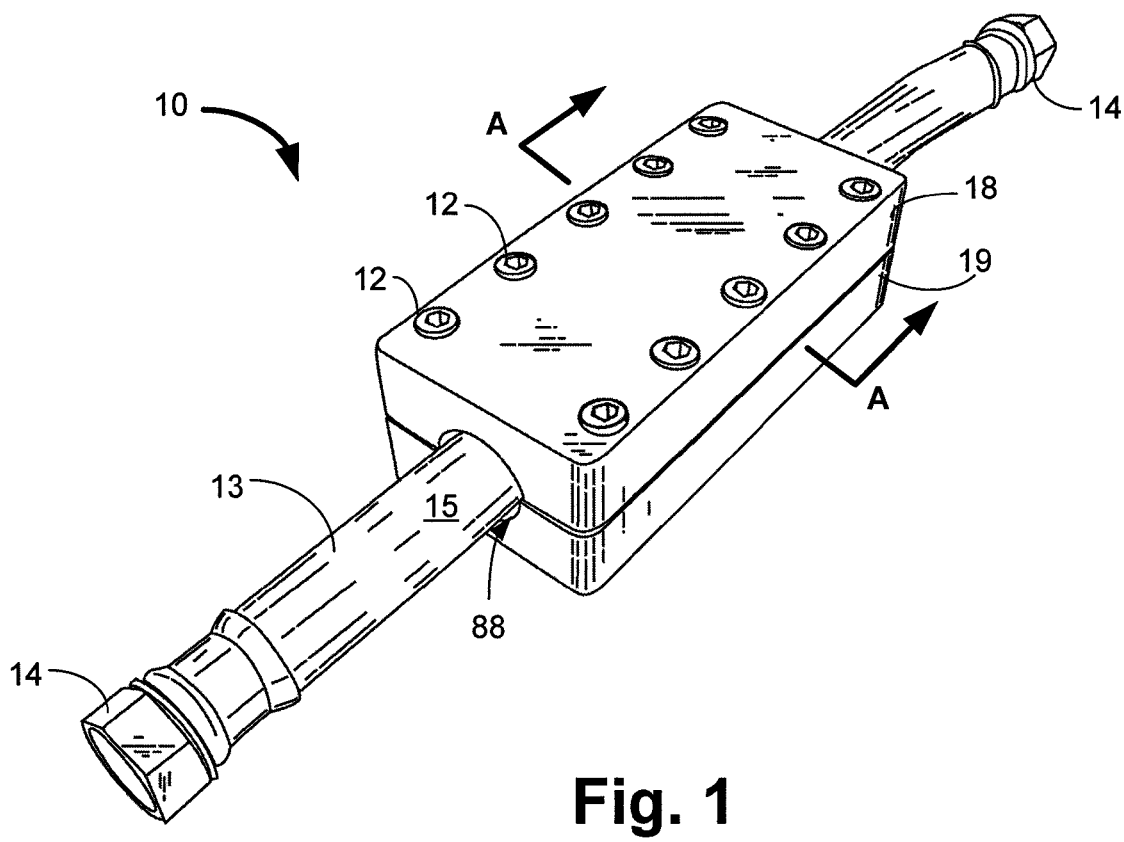
FIG. 1 is a top perspective view of an exemplary device in accordance with the present disclosure.

FIG. 1 is a top perspective view of a hose repair clamp 10 installed on a high pressure hose 13. The hose 13 is standard high pressure hydraulic hose that is known in the art. In one embodiment, the hose 13 is a 2- or 4-wire hydraulic hose, such as SAE 100R2AT hose. Hoses of this type typically have an inner layer (not shown) of synthetic rubber, a layer of braided wire (not shown), one or more layers of additional rubber and braided wire (not shown), and then an outermost layer 15 of rubber. Fittings 14 are disposed at opposing ends of the hose 13 for fastening the hose 13 to other devices.

The hose 13 is shown disposed within the hose repair clamp 10, which clamp 10 is installed to temporarily stop or slow leaks (not shown) in the hose. In this regard, the hose 13 is sandwiched between an upper clamp portion 18 and a lower clamp portion 19. The upper clamp portion 18 and the lower clamp portion 19 are joined together via a plurality of fasteners 12 to form a generally cylindrical chamber 88 through which the hose 13 extends.

The upper clamp portion 18 and the lower clamp portion 19 of the clamp 10 may be formed from aluminum or other suitably strong and rigid material. In one embodiment, the upper clamp portion 18 and the lower clamp portion 19 are formed from cast aluminum. The fasteners may be any of a number of standard threaded fasteners.

Figure 2:
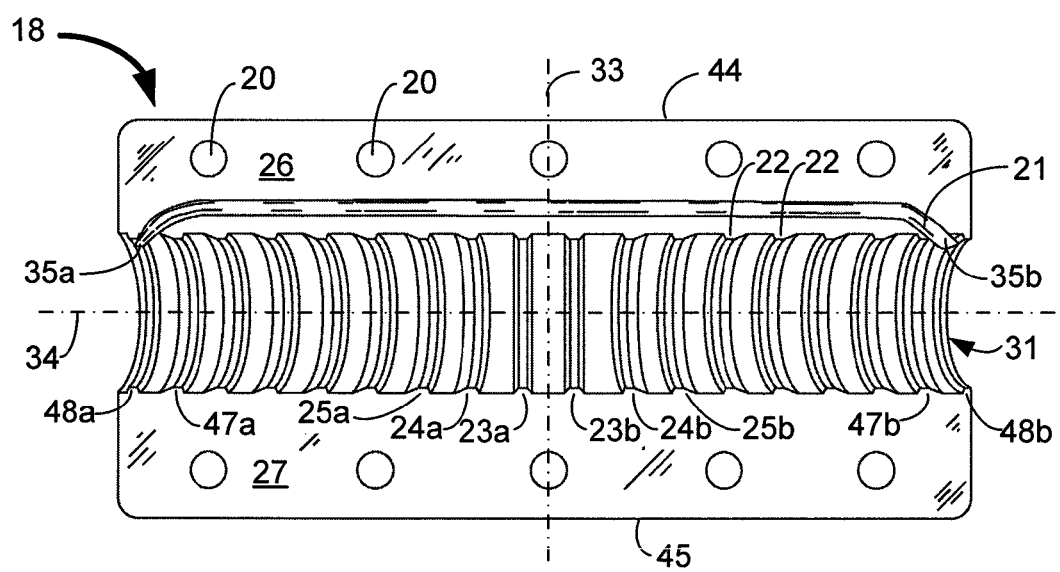
FIG. 2 is a bottom perspective view of an upper clamp portion in accordance with the present disclosure.

FIG. 2 is a bottom perspective view of the upper clamp portion 18. The upper clamp portion 18 is generally rectangular in this embodiment and comprises a channel 31 extending longitudinally along the upper clamp portion 18. The channel 31 is a generally semi-cylindrical cavity and receives the hose 13 (FIG. 1). A plurality of barbs 22 formed unitarily with the upper clamp portion 18 extend into the channel 31. The barbs 22 are protrusions that compress the hose 13 when the clamp 10 (FIG. 1) is installed onto the hose 13. In this embodiment, each barb 22 protrudes circumferentially around an inside surface of the channel 31.

In the illustrated embodiment, the upper clamp portion 18 is substantially symmetrical around a central transverse axis 33. The plurality of barbs 22 comprise central barbs 23a and 23b that extend inwardly in a radial direction. Subsequent barbs 22, such as those labeled 24a, 24b, 25a, and 25b, extend inwardly radially, and also extend toward the central transverse axis 33. In other words, barbs 24a and 24b are angled to extend toward each other, for example.

In operation of one embodiment of the clamp 10 (FIG. 1), the clamp portions 18 and 19 (FIG. 1) are installed with the leak (not shown) aligned with the central transverse axis 33. The angling of some of the barbs 22 helps to contain the leak by compressing the outermost layer 15 (FIG. 1) of the hose 13 (FIG. 1) "towards," or in the direction of, the leak. When the clamp 10 is installed on the hose 13, the barbs 22 compressing against the hose 13 (FIG. 1) helps to contain or slow leakage from the hose 13 in a longitudinal direction, i.e., along the hose.

A gasket 21 extends generally parallel to and spaced apart from the channel 31. The gasket 21 is disposed within a groove (not shown) received by and partially recessed within a clamp surface 26. The clamp surface 26 is generally flat and generally smooth and extends along a side 44 of the upper clamp portion 18. The gasket 21 has a generally circular cross section in the illustrated embodiment, and is formed from a resilient material such as silicone or Viton®. The gasket 21 is removable and replaceable when worn or damaged.

A sealing surface 27 extends along an opposed side 45 of the upper clamp portion 18. The sealing surface 27 is generally flat and generally smooth and is generally aligned with, i.e., in the same plane as, the clamp surface 26.

Note that free ends 35a and 35b of the gasket 21 terminate between the last two barbs 22 on each end of the clamp portion 18. Specifically, the free end 35a of the gasket 21 terminates between barb 47a and 48a, and the free end 35b terminates between barb 47b and 48b. In this embodiment, the last barb on each end (barbs 48a and 48b) compressing the outermost layer 15 (FIG. 1) of the hose 13 (FIG. 1) forms a seal against leakage out of the open ends of the clamp 10 (FIG. 1). In operation, the gasket 21 minimizes or prevents leakage along the "joint" between the clamp portions 18 and 19 (FIG. 1), and leakage that is contained by the gasket 21 near the ends of the clamp 10 may be contained by the end barbs 48a and 48b sealing against the outermost layer 15.

The upper clamp portion 18 further comprises a plurality of openings 20 spaced apart from one another along opposed sides 44 and 45 of the upper clamp portion 18. The openings 20 extend through the upper clamp portion 18 and receive fasteners 12 (FIG. 1) for joining the upper clamp portion 18 to the lower clamp portion 19 (FIG. 1). The illustrated embodiment shows five (5) openings along side 44 of the upper clamp portion 18 and five (5) openings along side 45 of the upper clamp portion 18. Other embodiments use more or fewer openings to receive more or fewer fasteners 12. Still other embodiments use attachment means (not shown) other than openings and fasteners to secure the upper clamp portion 18 to the lower clamp portion 19.

The upper clamp portion 18 is further generally symmetrical about a longitudinal axis 34, except that the side 45 of the upper clamp portion 18 comprises the groove (not shown) and gasket 21, as discussed above. The illustrated embodiment shows an upper clamp portion 18 with eighteen (18) barbs 22. Other embodiments may use more or fewer barbs 22.

Figure 3:
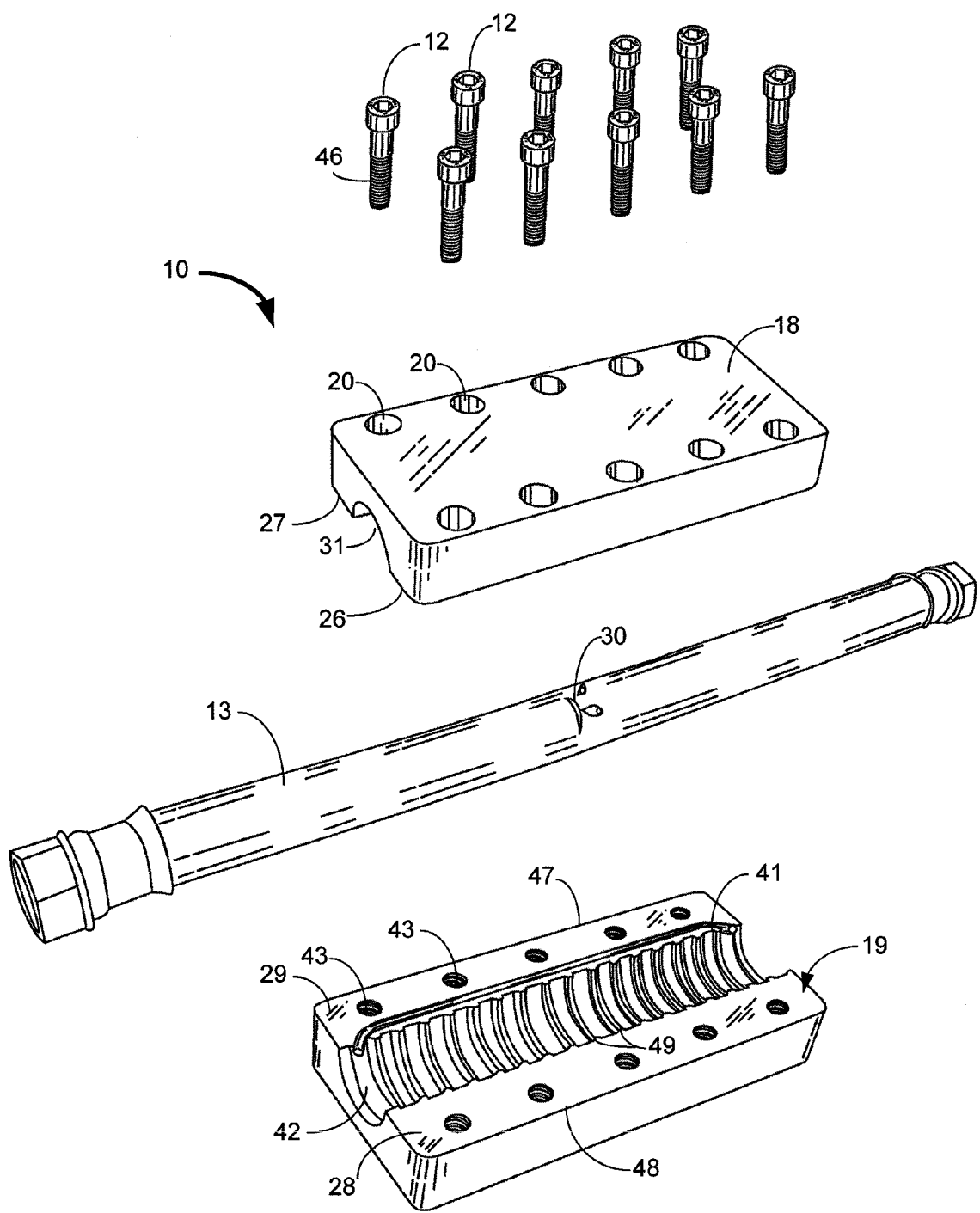
FIG. 3 is an exploded perspective view of the device of FIG. 1.

FIG. 3 is an exploded view of the clamp 10 of FIG. 1, showing the hose 13 with a leak 30 prior to installation into the clamp 10. In this embodiment, the lower clamp portion 19 is substantially similar to the upper clamp portion 18, except that a plurality of openings 43 in the lower clamp portion 19 are threaded to receive male threads 46 of the fasteners 12, and openings 20 in the upper clamp portion 18 are countersunk to receive standard fasteners 12. Other embodiments may use other fastening configurations.

The lower clamp portion 19 comprises a clamp surface 29 and a gasket 41 that is received by and partially recessed within a groove (not shown). The clamp surface 29 is generally flat and generally smooth and extends along a side 47 of the lower clamp portion 19. The gasket 41 has a generally circular cross section in the illustrated embodiment, and is formed from a resilient material such as silicone or Viton®. A sealing surface 28 extends along an opposed side 48 of the lower clamp portion 19. The sealing surface 28 is generally flat and generally smooth and is generally aligned with, i.e., in the same plane as, the clamp surface 29.

In operation of the clamp 10, the clamp 10 is installed on the hose 13 such that the hose 13 is positioned in a channel 42 of the lower clamp portion 19 with the leak 30 positioned at or near the center of the clamp 10. The clamp 10 may be positioned such that the leaking area of the hose will be adjacent to the center of the lower clamp portion 19. The upper clamp portion 18 is then installed over the hose 13 such that the gasket 21 (FIG. 2) of the upper clamp portion 18 contacts the sealing surface 28 of the lower clamp portion 19 and the gasket 41 of the lower clamp portion 19 contacts the sealing surface 27 of the upper clamp portion 18. The fasteners 12 are then installed in the openings 20 and 43 and tightened.

Tightening the fasteners 12 causes the upper clamp portion 18 and the lower clamp portion 19 to draw together, and causes the protrusions 22 (FIG. 2) of the upper clamp portion 18 and substantially similar protrusions 49 of the lower clamp portion 19 to compress the hose 13, minimizing leakage from the hose 13.

Figure 4:
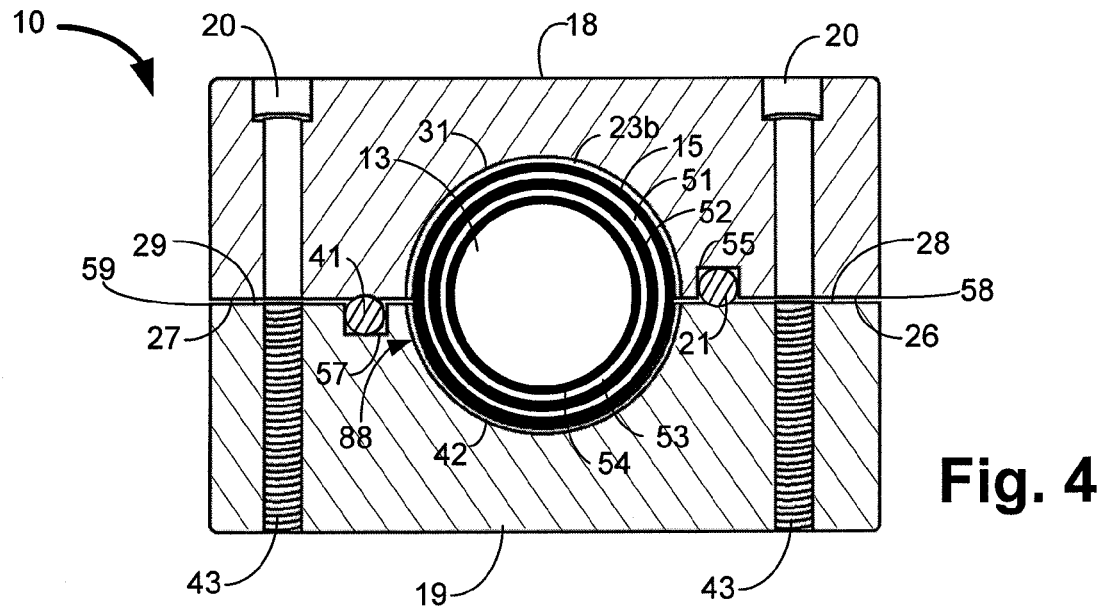
FIG. 4 is a cross-sectional view of the device of FIG. 1, taken along section lines A-A of FIG. 1

FIG. 4 is a cross-sectional view of the clamp 10 of FIG. 1, taken along section lines A-A of FIG. 1. The upper clamp portion 18 and lower clamp portion 19 are each generally rectangular in cross section in the illustrated embodiment. In other embodiments, the clamp portions 18 and 19 are differently shaped. The chamber 88 is generally cylindrical and is formed when the clamp portion 18 is joined with the clamp portion 19.

The openings 20 of the upper clamp portion 18 are standard countersunk holes in this embodiment. The openings 43 of the lower clamp portion 19 are standard threaded holes in this embodiment. Other embodiments use different openings for different fastening configurations.

The channels 31 and 42 of the upper clamp portion 18 and lower clamp portion 19, respectively, are each generally semi-circular in cross section for receiving a generally cylindrical hose 13. The hose 13 comprises multiple layers, and in this embodiment comprises an outermost rubber layer 15, a first metal layer 51, a first inner rubber layer 52, a second metal layer 53, and an innermost rubber layer 54. Other embodiments have differently-configured hoses 13.

In operation of the clamp 10, the barb 23b contacts and compresses the outermost rubber layer 15. Thus the barb 23b (and all of the barbs 22 (FIG. 2)) are generally sized to form a semi-circle that is smaller in diameter than the outer diameter then the outside diameter of the hose 13.

The gasket 21 is received by and retained within a groove 55. The gasket 41 is received by and retained within a groove 57. The grooves 55 and 57 are generally rectangular in cross-section in the illustrated embodiment, with a generally flat and smooth bottom surface. The gasket 21 of the upper clamp portion 18 seals against the sealing surface 28 of the lower clamp portion 19. The gasket 21 helps to prevent leakage from the hose at a first side joint 58 between the upper clamp portion 18 and the lower clamp portion 19.

Similarly, the gasket 41 of the lower clamp portion 19 seals against the sealing surface 27 of the upper clamp portion 19. The gasket 41 helps to prevent leakage from the hose at a second side joint 59 between the upper clamp portion 18 and the lower clamp portion 19. Note that the sealing surface 27 and the clamp surface 26 are in substantially the same plane, and the sealing surface 28 and the clamp surface 29 are in substantially the same plane, enabling the surfaces to mate against each other in close contact and further enabling a tight seal by the gaskets 21 and 41.

Figure 5:
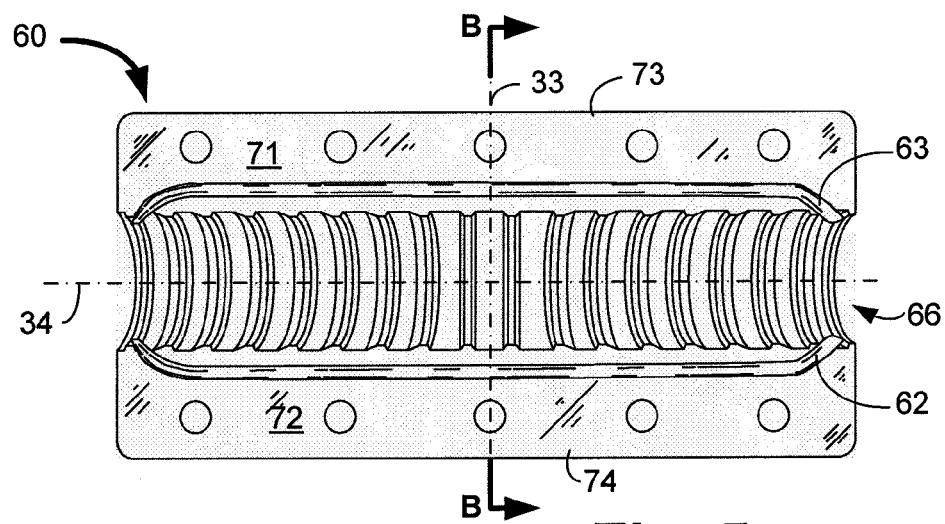
FIG. 5 is a bottom perspective view of a lower clamp portion according to an embodiment of the present disclosure.

FIG. 5 is a bottom perspective view of an alternative embodiment of a lower clamp portion 60 according to the present disclosure. In this embodiment, the lower clamp portion 60 is substantially similar to the lower clamp portion 19 of FIG. 3, except that the lower clamp portion 60 comprises two (2) gaskets 62 and 63 which extend along a channel 66. The lower clamp portion is substantially symmetrical around the longitudinal axis 34 of the clamp 60.

Figure 6:
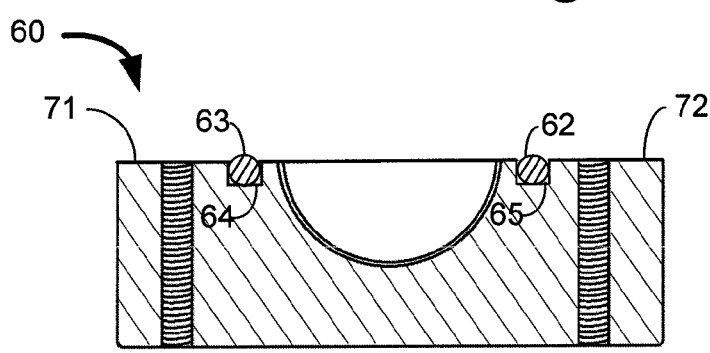
FIG. 6 is a cross-sectional view of the lower clamp portion of FIG. 5, taken along section lines B-B of FIG. 5.

FIG. 6 is a cross-sectional view of the lower clamp portion 60 of FIG. 5, taken along section lines B-B of FIG. 5. The gaskets 62 and 63 are received by grooves 65 and 64, respectively. The grove 64 is recessed within a clamp surface 71, and the groove 65 is recessed within a clamp surface 72. The clamp surfaces 71 and 72 are generally flat and smooth, and are in substantially the same plane.

The lower clamp portion 60 is designed to seal against an upper clamp portion (not shown) that has a smooth sealing surface (not shown) without any gaskets or grooves. In other words, while the embodiment pictured in FIG. 4 comprises an upper clamp portion 18 and lower clamp portion 19 which each comprise a gasket 21 and 41, respectively, which seal against opposed smooth sealing surfaces 28 and 27 of the opposite clamp portion, the embodiment of FIG. 5 comprises a lower clamp portion 60 in which both gaskets 62 and 63 are located in the lower clamp portion 60 and which seals against smooth sealing surfaces of the opposed clamp portion.

Figure 7:
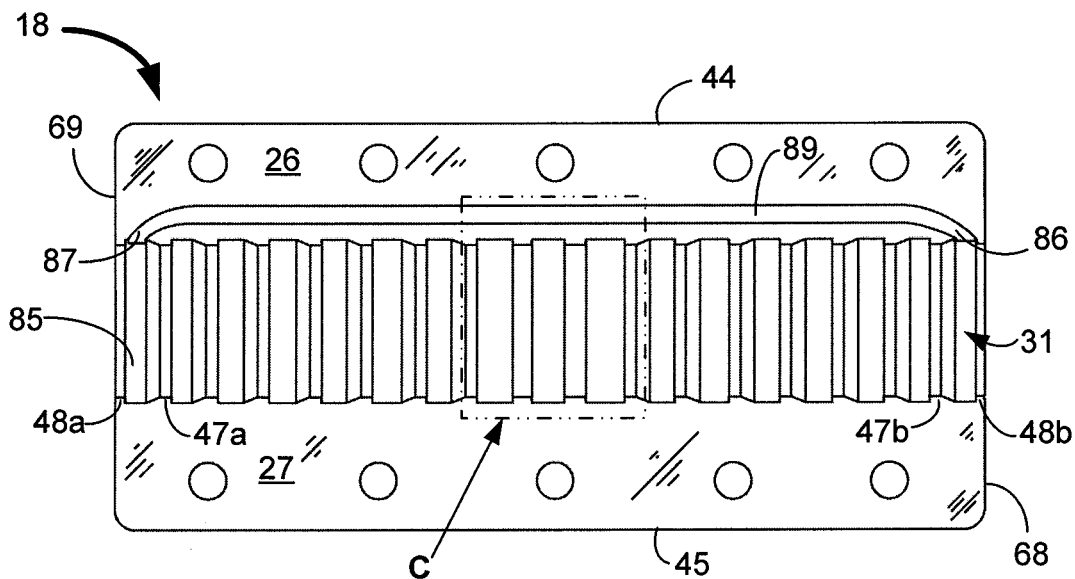
FIG. 7 is a bottom plan view of the lower clamp portion of FIG. 2.

FIG. 7 is a bottom plan view of the lower clamp portion 18 of FIG. 2, shown without the gasket 21 (FIG. 2). The channel 31 extends longitudinally along the clamp and comprises a floor 85 which is generally the outermost "level" of the channel 31, i.e., the floor 85 extends semi-circularly along the channel 31 between adjacent barbs, e.g., 48a, 47a, 47b, 48b, etc. The barbs, e.g., 48a, 47a, 47b, 48b, etc. protrude inwardly from the floor 85.

The groove 89 extends longitudinally along the clamp portion 18 adjacent to and generally parallel to the channel 31. At its opposed ends 86 and 87, the groove 89 extends toward the channel 31 and terminates in the channel 31 at the floor 85 between the outermost barbs 47a and 48a (on one end of the clamp portion 18) and 47b and 48b (on the other end of the clamp portion 18).

A right side 69 of the clamp portion 18 is generally straight and generally parallel to a left side 68 of the clamp portion 18, which is also generally straight. Opposed sides 44 and 45 of the clamp portion 18 are generally parallel to one another and generally perpendicular to the sides 68 and 69. The channel 31 is generally parallel to the sides 44 and 45 and in the illustrated embodiment is generally centered therebetween.

Figure 8:
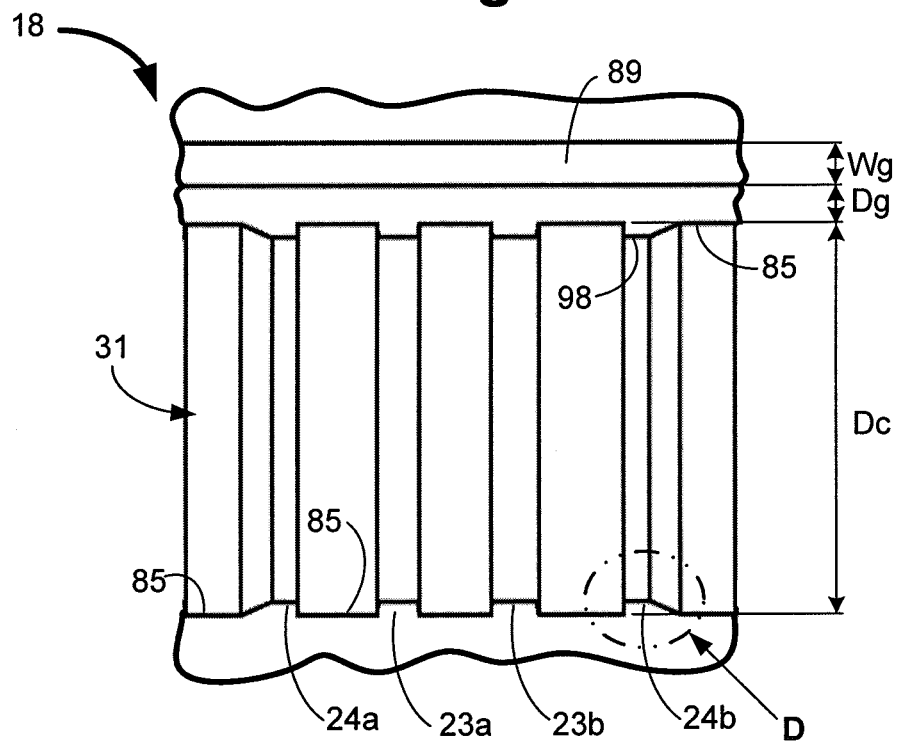
FIG. 8 is an enlarged detail view of the lower clamp portion of FIG. 7, taken along detail C of FIG. 7.

FIG. 8 is an enlarged detail view of the clamp portion 18 of FIG. 7, taken along detail line C. "Dc" is the outermost diameter of the clamp 10 (FIG. 1), as measured from the floor 85, i.e., between the barbs. Dc is generally less than an outer diameter of a hose 13 (FIG. 1) to be repaired. Thus when the clamp 10 is installed on a hose 13, even at the clamp's largest diameter, the channel 31 compresses the hose 13, by 3/32 inches in one embodiment. (i.e., in one embodiment, the outer diameter of the hose 13 minus Dc=3/32 inches.)

The distance between the floor 85 and the groove 89, Dg, is generally 0.125 in one embodiment. The width of the groove, Wg, is generally 0.125 in one embodiment.

Figure 9:
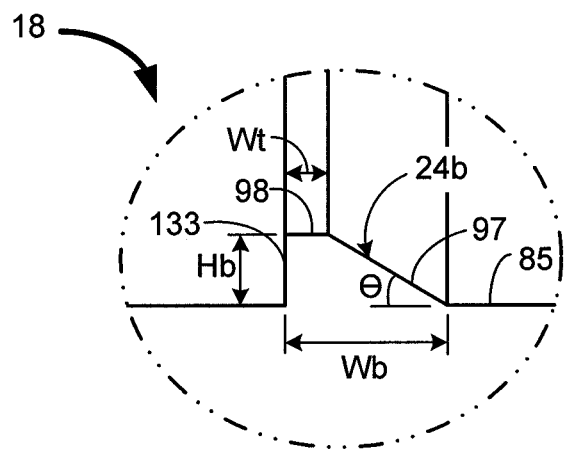
FIG. 9 is an enlarged detail view of the lower clamp portion of FIG. 8, taken along detail D of FIG. 8.

FIG. 9 is an enlarged detail view of the clamp portion 18 of FIG. 8, taken along detail line D of FIG. 8. Barb 24b protrudes from the floor 85 a height of Hb, measured from the floor 85 to a top side 98 of the barb 24b. The barb 24b has a base width Wb at a lower portion; the width Wb is generally 0.375 in one embodiment. "Hb" is the height of a barb with respect to the floor, and in one embodiment is 0.125 inches. The top side 98 is generally straight and generally parallel to the floor 85 and has a width "Wt" of 0.062 in one embodiment.

The barb 24b has a straight side 133 that extends inwardly generally perpendicularly to the floor 85. The barb 24b further has an angled side 97 that extends inwardly at an angle of θ with respect to the floor 85. In one embodiment, the angle θ is 30 degrees.

Figure 10:
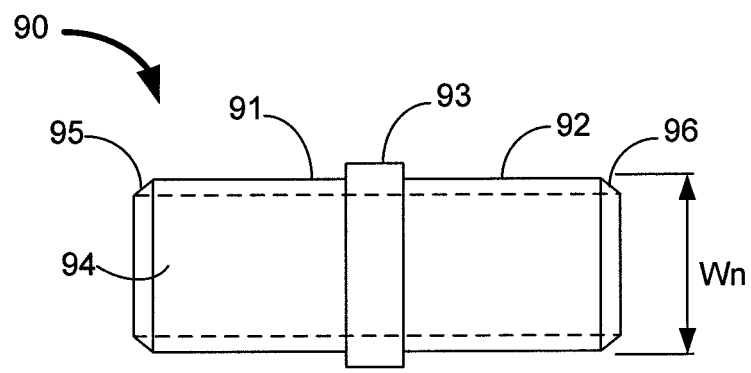
FIG. 10 is a side plan view of a nipple 90 according to an exemplary embodiment of the present disclosure.

FIG. 10 is a side plan view of an insert 90 that may be used in repairing the hose 13 (FIG. 1) in some embodiments. The insert 90 may be needed if the leak is a rupture of, for example, more than 30% of the diameter of the hose, or if the rupture is an inch or longer, or if an outer wire layer is worn through more than three inches. In these exemplary instances, the hose 13 may be repaired by cutting the hose into two pieces at the rupture, trimming the ends as may be desired, and inserting the insert 90 into the open ends of the house 13 before installing the clamp 10 (FIG. 1).

The insert 90 is a unitary cylindrical two-sided hollow nipple with opposed sides 91 and 92 which are insertable into the hose 13. A cylindrical opening 94 extends through the insert 90. Ends 95 and 96 are chamfered or tapered to allow for ease in inserting the inset 90 into the hose 13. A centrally-disposed ledge 93 extends circumferentially around the insert and prevents the insert 90 from entering the hose too deeply. An outer diameter "Wn" of the insert 90 is sized such that the insert 90 is insertable into the hose 13.

What is claimed is:

1. A hose repair clamp comprising:
   a first clamp portion, the first clamp portion comprising a first channel, the first clamp portion further comprising a plurality of spaced apart barbs extending into the first channel, the first clamp portion comprising a first groove that receives a first gasket, the first gasket comprising a strip with opposed free ends, the first gasket having substantially circular cross section, the first groove recessed into a first side surface substantially parallel to and alongside the first channel, the first groove having opposed straight side walls and a substantially flat and smooth bottom surface that define a generally rectangular cross section, and a first sealing surface disposed on an opposed side of the first clamp portion, wherein the first sealing surface is in the same plane as the first side surface; and wherein opposed terminal ends of the first groove extend into the first channel adjacent to and inside of outermost barbs of the first clamp portion;
   a second clamp portion, the second clamp portion comprising a second channel, the second clamp portion further comprising a plurality of spaced apart barbs extending into the second channel, the second clamp portion comprising a second groove that receives a second_gasket, the second gasket comprising a strip with opposed free ends, the second gasket having substantially circular cross section, the second groove recessed into a second side surface substantially parallel to and alongside the second channel, the second groove having opposed straight side walls and a substantially flat and smooth bottom surface that define a generally rectangular cross section, and a second sealing surface disposed on an opposed side of the second clamp portion, wherein the second sealing surface is in the same plane as the second side surface, wherein opposed terminal ends of the second groove extend into the second channel adjacent to and inside of the outermost barbs of the second clamp portion;
   the first and second clamp portions being mateable onto a high pressure hose such that the hose is disposed within the first and second channels and the protrusions protrude into the hose; and
   at least one fastener releasably affixing the first clamp portion and the second clamp portion together, wherein the first gasket seals against the second sealing surface and the second gasket seals against the first sealing surface.

2. The hose repair clamp of claim 1, wherein each of the first and second channel is semi-cylindrical in shape and the barbs extend circumferentially around an inner surface of the first channel and the second channel.

3. The hose repair clamp of claim 2, wherein the barbs are formed unitarily with either the first or second clamp portions.

4. The hose repair clamp of claim 2, wherein at least two of the plurality of barbs angle towards a center of the clamp.

5. A hose repair clamp comprising:
   two substantially similar clamp halves releasably affixed together, each clamp half_comprising a plurality of semi-circular barbs extending into a channel, each clamp half further comprising a groove, that receives a gasket, the gasket comprising a strip with opposed free ends, the gasket having substantially circular cross section, the groove recessed into a first side surface substantially parallel to and extending alongside the first channel, the groove having opposed straight side walls and a substantially flat and smooth bottom surface that define a generally rectangular cross section, the groove curving at its terminal ends and terminating at the first channel adjacent to and inside of outermost barbs of the clamp half, each clamp half further comprising a sealing surface disposed on an opposed side of the clamp half;

at least one fastener releasably affixing the plurality of clamp halves together, such that when the clamp halves are joined together, the gasket of a first clamp half seals against the sealing surface of a second clamp half and the gasket of the second clamp half seals against the sealing surface of the first clamp half;

a hose received by the channel such that the barbs protrude into the hose and compress the hose.

6. A hose repair clamp, comprising:

a first clamp portion comprising a first channel, the first channel comprising a plurality of semi-circular protrusions, a first gasket groove extending alongside and disposed outwardly from the first channel, the first gasket groove having opposed straight side walls and a substantially flat and smooth bottom surface that define a generally rectangular cross section, the first gasket groove comprising terminal ends that extend into the channel inside of outermost protrusions of the first clamp portion, the first gasket groove receiving a first gasket, the first gasket comprising a strip with opposed free ends, the first gasket having substantially circular cross section;

a second clamp portion comprising a second channel, the second channel comprising a plurality of semi-circular protrusions, a second gasket groove extending alongside and disposed outwardly from the second channel, the second gasket groove having opposed straight side walls and a substantially flat and smooth bottom surface that define a generally rectangular cross section, the second gasket groove comprising terminal ends that extend into the channel inside of outermost protrusions of the second clamp portion, the second gasket groove receiving a second gasket, the second gasket comprising a strip with opposed free ends, the second gasket having substantially circular cross section, a plurality of fasteners releasably coupling the first clamp portion and the second clamp portion together such that when the first clamp portion and the second clamp portion are coupled together, the first gasket seals against a sealing surface of the second clamp portion and the second gasket seals against a sealing surface of the first clamp portion and the first and second channels form a chamber through which a hose can be inserted and the plurality of protrusions extend into the hose and apply pressure to the hose.

7. The hose repair clamp of claim 6, the chamber having an outer diameter that is smaller than the outer diameter of the hose.

\* \* \* \* \*